H. W. BARROWS.
VACUUM BRAKE.
APPLICATION FILED AUG. 14, 1920.
1,399,099.
Patented Dec. 6, 1921.
2 SHEETS—SHEET 1.
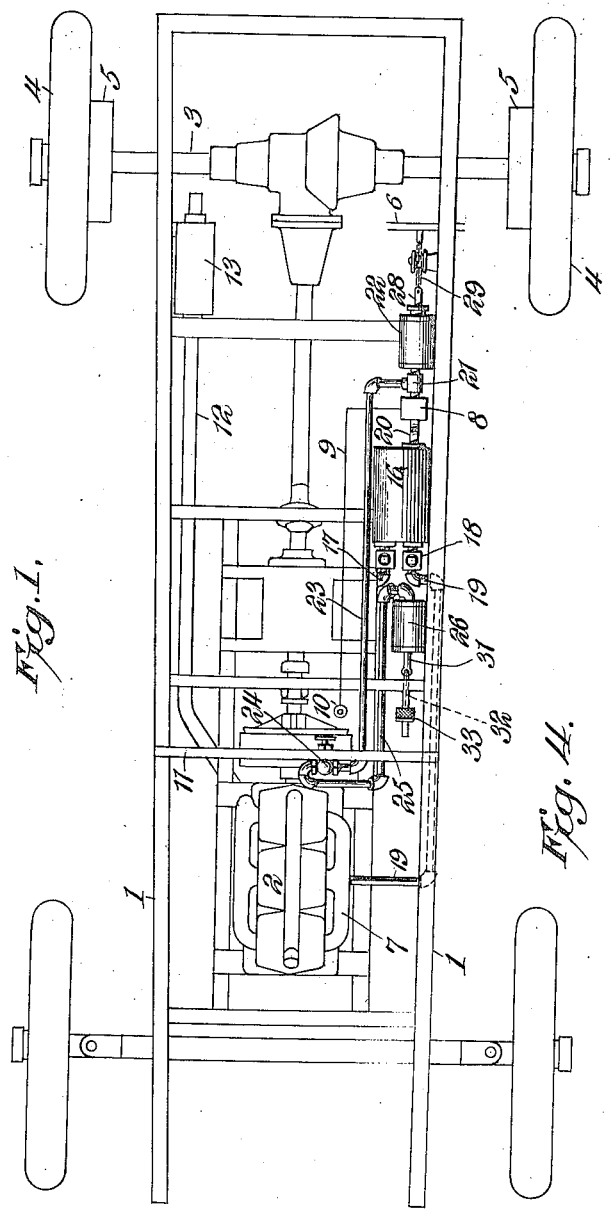
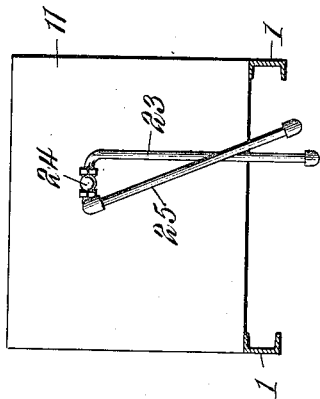
WITNESSES
Howard D. Orr.
F. T. Chapman.
H. W. Barrows, INVENTOR,
BY
ATTORNEY H. W. BARROWS.
VACUUM BRAKE.
APPLICATION FILED AUG. 14, 1920.
1,399,099.
Patented Dec. 6, 1921.
2 SHEETS—SHEET 2.
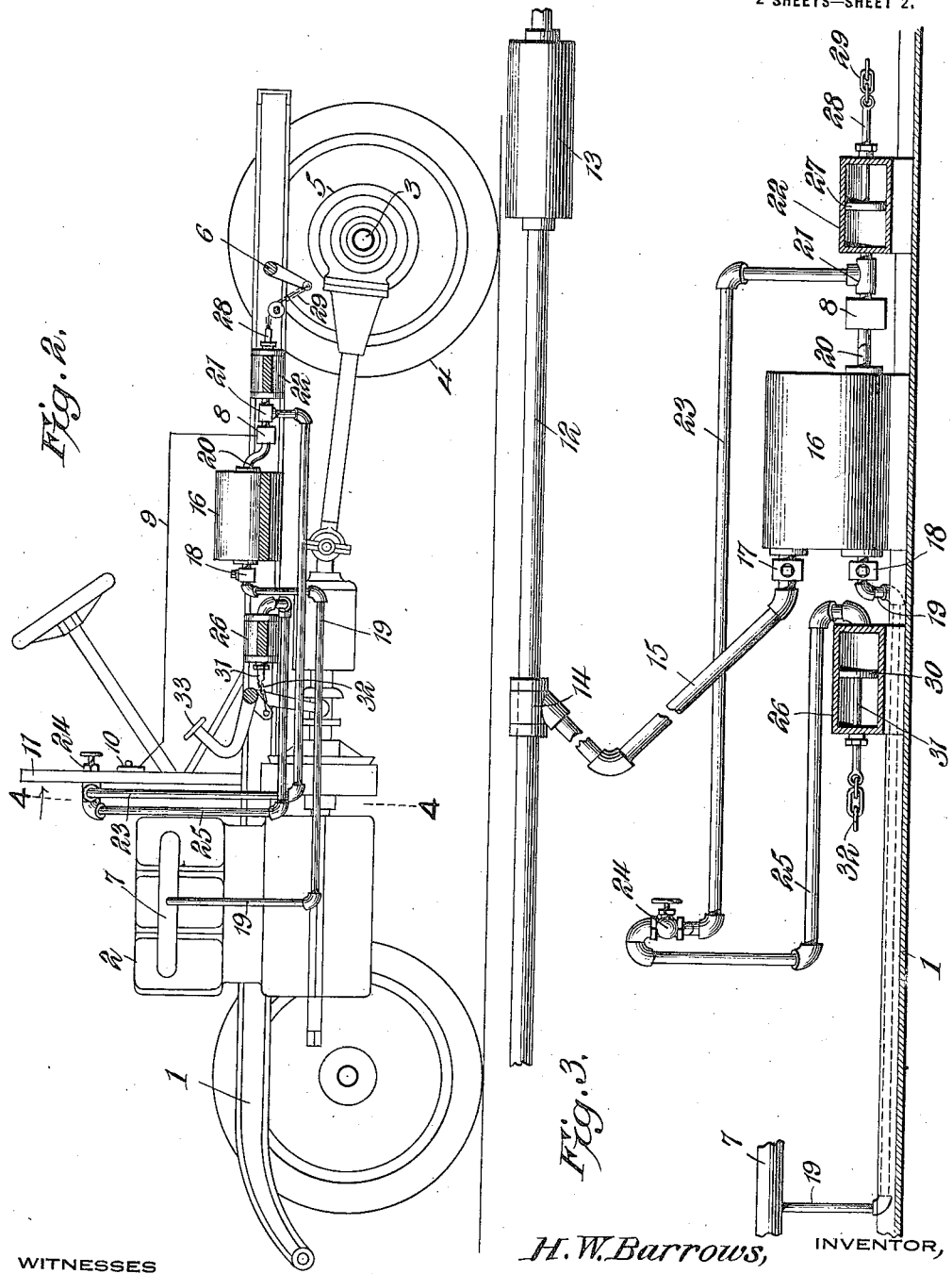
WITNESSES
Howard D. Orr.
F. T. Chapman.
INVENTOR,
H. W. Barrows,
BY
C. G. Siggers.
ATTORNEY

UNITED STATES PATENT OFFICE.

HARRY W. BARROWS, OF OMAHA, NEBRASKA.

VACUUM-BRAKE.

1,399,099.  Specification of Letters Patent.  Patented Dec. 6, 1921.

Application filed August 14, 1920. Serial No. 403,444.

*To all whom it may concern:*

Be it known that I, HARRY W. BARROWS, a citizen of the United States, residing at Omaha, in the county of Douglas and State of Nebraska, have invented a new and useful Vacuum-Brake, of which the following is a specification.

This invention has reference to vacuum brake systems for automobiles or other vehicles, and comprises an arrangement of operating elements under the control of the operator of the vehicle and operating under atmospheric pressure by reason of subatmospheric pressure caused by the suction established in the intake manifold of the engine of the vehicle and elsewhere, when the propelling unit of the vehicle is in the form of an explosion engine.

The invention is based upon the employment of a valve structure such as is disclosed in my Letters Patent No. 1,291,723, granted to me on January 21, 1919, and the object of the invention is to provide a system permitting the use, in an automobile or like vehicle, of the valve structure, or similar device, described and claimed in said Letters Patent.

In accordance with the invention cylinders and pistons are provided and so arranged that vacuum conditions established in the intake manifold and by the exhaust discharge of the automobile engine cause the actuation of the vehicle brakes and the control of the clutch mechanism in such manner that, when it is desired to control or stop the vehicle, the clutch is thrown out of engagement or into the inoperative position and the brakes are immediately moved into engaged position to arrest or slow down the progress of the vehicle, the parts being coordinated to operate in proper sequence or substantially simultaneously.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings:

Figure 1 is a plan view, in more or less diagrammatic outline, of an automobile chassis equipped with the invention.

Fig. 2 is a longitudinal section of the chassis showing the brake system in side elevation.

Fig. 3 is a plan view similar to that of Fig. 1, and drawn on a larger scale, some parts being shown in section, and other parts being less extensively shown than in Fig. 1, and still other parts shown in Fig. 1 being omitted.

Fig. 4 is a section on the line 4—4 of Fig. 2, but omitting the power unit of the vehicle.

Referring to the drawings there is shown an automobile chassis frame 1 provided with an engine 2 considered as of the explosion type, a rear axle 3, and wheels 4 and with brake hubs 5 under the control of a tumbling shaft 6, all in accordance with the usual practice.

The engine 2 may be assumed to be provided with the usual intake manifold 7 in which, when operating, there is produced a vacuum depending upon the suction of the engine.

At a convenient location, which may be near the rear end of the vehicle, there is a brake-valve-operating means 8 for the construction and operation of which reference is directed to my aforesaid Letters Patent No. 1,291,723. The brake valve operating means 8 has an electric conductor 9 (see Fig. 2), connected to it for operating it, as described in said Letters Patent, and this conductor leads to a push button 10, or other suitable device, which may be mounted on the dash board 11 of the vehicle within convenient reach of the operator.

The engine is also provided with an exhaust pipe 12 and a muffler 13. Carried by and connected to the exhaust pipe 12 is a Y-pipe-saddle 14 connected by a pipe 15 to one end of an air drum 16, the connection of the pipe 15 with the drum 16 being through a check valve 17 closing toward the drum 16. Connected with the drum 16 there is another check valve 18 closing toward the drum and on the side remote from the drum connected by a pipe 19 to the intake manifold 7. The check valves 17 and 18 are connected with one head of the drum 16 and the other head of the drum is connected by a pipe 20 to the vacuum brake valve 8, which, in turn, is connected through a T coupling 21 to a cylinder 22 constituting a brake cylinder. The coupling 21 receives one end of a pipe 23 carried to a cut out valve 24 so situated as to be within ready reach of an operator, and hence may be mounted on or extended through the dash 11. Leading from the valve 24 is a pipe 25 entering one end of another cylinder 26 adjacent to the front end of the drum 16. Within the cylinder 22 is a piston 27 carrying a piston rod 28 connected by a chain 29 or in other appropriate manner to the tumbling shaft 6 controlling the hub brakes of the wheels. Within the clutch cylinder 26 is a piston 30 connected to a piston rod 31 for power control of the clutch and also having a chain connection 32 with a foot lever 33 for the manual control of the clutch.

When the engine is in operation the suction of the engine establishes vacuum conditions in the intake pipe 7 thereby causing the withdrawal of air through the pipe 19 from the drum 16. At the same time the exhaust through the pipe 12, because of the acute angular relation of the saddle 14 to the pipe 12, causes a withdrawal of air by way of the pipe 15 from the drum 16, these conditions continuing until the degree of vacuum for which the drum 16 is designed, is reached. In the meantime the vacuum brake valve 8 remains closed and the vacuum is held in the drum 16 by the check valves 17 and 18.

The degree of vacuum established and maintained in drum 16 ultimately reaches a maximum and remains at such a maximum until it is desired to slow down or stop the vehicle. To do this, the valve 8 is operated in the manner described in the aforesaid Letters Patent and the cylinders 22 and 26 are coupled up to the drum 16 so that vacuum conditions are established therein, thus applying the hub brakes by way of a piston 27, piston rod 28 and chain 29, and releasing the clutch by way of the piston 30, the piston rod 31 and connections to the clutch.

The clutch is the customary structure interposed between the power unit, represented by the engine 2, and the usual connecting gearing common to automobiles and hence need not be specifically shown. Both the operations of releasing the clutch and applying the brakes are brought about by pneumatic means operated by atmospheric pressure through the establishment of sub-atmospheric pressure in the drum 16, such sub-atmospheric pressure being quickly re-established so long as the engine is running. There are times, however, when the engine is not running and recourse must be had to the vacuum conditions already established in the drum 16 to either hold the vehicle on a hill or to apply the brakes for some reason. Under such circumstances the drum 16, which has several times the combined capacity of the cylinders 22 and 26 and the pipe connections between them, permits two or three or more applications of the brakes and the release of the clutch before it may be necessary to restore workable vacuum conditions in the drum 16.

The check valves employed prevent vacuum conditions within the drum 16 from drawing air thereinto and so breaking and reducing the vacuum. When desired the vacuum conditions within the drum are utilized to bring about movement of air from the cylinders 22 and 26 toward the drum and the desirable operation of the brakes and clutch results thus causing the application of the brakes and the release of the clutch, all automatically, but under the control of an operator. This relieves the operator from all exertion, since the slight exertion of operating the button 10 need not be taken into account. The large capacity of the drum 16 is of value when the vehicle is traveling down hill with the engine dead and it becomes necessary to apply the brakes several times. The capacity of the drum 16 is made large enough to avoid loss of efficiency in the braking outfit. Of course repeated applications of the brakes without restoration of the vacuum conditions would ultimately fill the drum 16 with air, but this need not occur where care is taken to properly restore the vacuum conditions as occasion may admit.

The size of the drum 16 is made sufficient to provide for three or more stoppings of the car representing full application of the brakes or to provide for slowing down the vehicle quite a large number of times where the demand upon the tank 16 is considerably less than what is required for completely stopping the vehicle.

When the valve 24 is open the same vacuum conditions may prevail in both cylinders 22 and 26 but when the valve 24 is closed the conditions are such that the cylinder 26 is inactive and the brake cylinder 22 alone performs any function. When the clutch cylinder 26 is inactive the clutch pedal may be operated by foot in the usual manner. Provision may also be made for the application of the brakes by foot, when so desired, after the manner of an ordinary foot brake.

What is claimed is:

1. In an automobile provided with a clutch between the power unit and the drive wheels, and also provided with brakes, means for producing vacuum conditions, brake operating means responsive to the vacuum conditions, means for moving the clutch to the unclutched position also responsive to the vacuum conditions, and means under the control of an operator for utilizing the vacuum conditions with respect to the brake operating means and the clutch means either together or with respect to the brake means alone.

2. In an automobile provided with a clutch between the power unit and the drive wheels and with brakes, means for causing the opening of the clutch by vacuum conditions, means for causing the application of the brakes by vacuum conditions, and means under the control of an operator for utilizing vacuum conditions in the intake of the power unit to operate the clutch opening and the brake operating means.

3. In an automobile provided with a clutch between the power unit and the drive wheels and with brakes, a cylinder and piston therein responsive to vacuum conditions, connections between the piston and the clutch for uncoupling the clutch, another cylinder with a piston therein and responsive to vacuum conditions, connections between the second named piston and the brakes of the automobile for applying the brakes by the establishment of vacuum conditions in the second cylinder, connections between the intake of the power unit and the cylinders, and means under the control of an operator for causing vacuum conditions in both cylinders or in the brake cylinder alone.

4. In an automobile provided with a clutch between the power unit and the drive wheels and with brakes, a cylinder and piston thereon responsive to vacuum conditions, connections between the piston and the clutch for uncoupling the clutch, another cylinder with a piston therein and responsive to vacuum conditions, connections between the second named piston and the brakes of the automobile for applying the brakes by the establishment of vacuum conditions in the second cylinder, connections between the intake of the power unit and the cylinder, and means under the control of an operator for causing vacuum conditions in both cylinders or in the brake cylinder alone, said connections including a pipe branched from the vacuum controlling means to the cylinder controlling the clutch means and including a valve by means of which the clutch cylinder may be coupled to or cut off from the vacuum controlling means.

5. In an automobile provided with a clutch between the power unit and the drive wheels, and also provided with brakes, a drum from which air may be exhausted, non-return connections between the drum and the intake manifold of the power unit and one-way connections between the exhaust pipe of the power unit and the drum whereby both the suction of the power unit and the force of the exhaust may cause vacuum conditions in the drum, means responsive to the vacuum conditions created in the drum for moving the clutch to the unclutched position, and means under the control of an operator for utilizing the vacuum conditions in the drum to cause the operation of the brakes.

6. In an automobile provided with a clutch between the power unit and the drive wheels, and also provided with brakes, a drum from which air may be exhausted, non-return connections between the drum and the intake manifold of the power unit and one-way connections between the exhaust pipe of the power unit and the drum, whereby both the suction of the power unit and the force of the exhaust may cause vacuum conditions in the drum, means responsive to the vacuum conditions created in the drum for moving the clutch to the unclutched position, and means under the control of an operator for utilizing the vacuum conditions in the drum to cause the operation of the brakes, said means under the control of the operator being movable to operate the clutch and the brakes together or to operate the brakes alone.

7. In an automobile provided with a clutch between the power unit and the drive wheels, and also provided with brakes, a drum, means for producing vacuum conditions in the drum, vacuum responsive means connected to the clutch for moving the latter to the unclutched position, vacuum responsive means connected to the brakes for applying the latter, and means under the control of an operator for utilizing the vacuum conditions in the drum to operate the clutch to the unclutched position, and means under the control of the operator for utilizing the vacuum conditions in the drum to apply the brakes.

8. In an automobile provided with a clutch between the engine of the automobile and the drive wheels, and also provided with brakes, a drum, connections between the drum and the intake manifold of the engine to produce vacuum conditions in the drum by the suction of the engine, connections between the drum and the exhaust pipe of the engine, and means under the control of an operator for utilizing the exhaust conditions in the drum to operate the clutch to the unclutched position and to apply the brakes.

In testimony that I claim the foregoing as my own, I have hereto affixed my signature.

HARRY W. BARROWS.